United States Patent [19]

Denker et al.

[11] Patent Number: 5,034,087

[45] Date of Patent: Jul. 23, 1991

[54] SELF-ADJUSTING HEAT SEAL BAR

[75] Inventors: Stanley D. Denker, New Richmond; Bradley H. Lehrke, Robert, both of Wis.

[73] Assignee: Doboy Packaging Machinery, Inc., New Richmond, Wis.

[21] Appl. No.: 438,254

[22] Filed: Nov. 16, 1989

[51] Int. Cl.[5] .......................... B30B 5/06; B30B 15/34

[52] U.S. Cl. .................................... 156/555; 156/580; 156/583.1; 156/583.5; 100/93 RP; 100/154

[58] Field of Search .................. 156/583.5, 583.1, 580, 156/555, 470; 100/93 RP, 151, 153, 154

[56] References Cited

U.S. PATENT DOCUMENTS

| | | | |
|---|---|---|---|
| 2,392,695 | 5/1943 | Rohdin | 154/42 |
| 2,451,728 | 10/1948 | Gardner et al. | 100/93 RP |
| 2,469,972 | 2/1945 | Lowry et al. | 154/42 |
| 2,542,901 | 2/1951 | Chaffee | 100/151 X |
| 2,658,552 | 11/1953 | Grevich | 100/151 X |
| 3,218,961 | 11/1965 | Kraft et al. | 156/583.1 X |
| 3,326,735 | 6/1967 | Beason, Jr. | 156/583.4 X |
| 3,607,523 | 9/1971 | McGirr | 156/470 X |
| 3,676,268 | 7/1972 | Brandenburg et al. | 156/470 X |
| 3,988,184 | 10/1976 | Howard | 156/66 |
| 4,004,963 | 1/1977 | Denker | 156/583.5 |
| 4,016,026 | 4/1977 | Grevich | 156/583.5 X |
| 4,080,241 | 3/1978 | Grevich et al. | 156/583.5 X |
| 4,202,721 | 5/1980 | Roberts | 156/358 |
| 4,378,266 | 3/1983 | Gerken | 156/359 |
| 4,406,719 | 9/1983 | Mitsumoto et al. | 156/52 |
| 4,645,632 | 2/1987 | Böttger et al. | 264/120 |
| 4,687,528 | 8/1987 | Held | 156/150 |
| 4,718,843 | 1/1988 | Carlsson et al. | 425/371 |
| 4,755,252 | 7/1988 | Held | 156/389 |
| 4,819,737 | 4/1989 | Frase | 172/156 |

*Primary Examiner*—Richard Bueker
*Assistant Examiner*—J. Sells
*Attorney, Agent, or Firm*—Haugen & Nikolai

[57] ABSTRACT

A system for controlling and modulating the pressure between members of pairs of heating and/or cooling members or bars utilized in a heat sealing machine is disclosed. Closer, more sensitive control of the inter-bar gap and allowable sealing pressure is achieved by the provision of a fluid pressure adjustable, spring-biased system which can be used to modulate the maximum force applied to the band between the bars according to the type of configuration of material to be processed.

15 Claims, 3 Drawing Sheets

50
51
60
61
5
52
44
48
5
12
34
20
19
13
11
33
48A
37
37
37

48
40
49A
41
49
47
45A
49
45
44
43
46
45
12
42

SELF-ADJUSTING HEAT SEAL BAR

BACKGROUND OF THE INVENTION

1. Field of the Invention

The present invention relates generally to film heat sealing machines used for closing and sealing bags, such as polyethylene bags and other containers for merchandise, under heat and pressure. More particularly, the invention relates to controlling the gap and thereby the pressure exerted in the sealing process between pairs of opposed heat transfer elements located on opposite sides of the path of the continuous traveling band which conveys films to be sealed through such machines.

2. Description of the Related Art

Sealing machines of the class to which the present invention generally pertains employ a pair of continuous bands, made of steel, fiberglass or other similar materials, which are arranged to travel in the same direction in confronting parallel relation with each other along a sealing run. The film laminae or layers of plastic material to be sealed together travel sequentially along the sealing run between the bands and the seal is made by simultaneously applying heat and pressure to the laminae as it travels between the bands along the sealing path. The material to be sealed is carried between a pair of continuous belts or chains also arranged to travel in the same direction in confronting parallel relation and at the speed of the sealing bands.

At least one pair of bars or platens flanking the continuous bands apply heat and pressure to seal the laminae through the bands. These heater bars are normally mounted on the frame of the machine and have generally been stationary with respect to the frame of the machine, so that they remain close to the traveling bands but allowance is made for the thickness of the film material to be sealed which travels therebetween. Ample room has had to be supplied so that the film material would not produce jamming of the machine in the event that wrinkles or multiple thickness were encountered during high speed operation.

More recently, the heater bars have been mounted on springs so that the entire heater bars are movable inwardly and outwardly a certain amount and apply a constant pressure against the moving bands and thus the film material being heat sealed so that the sealing is effected under spring loaded compression pressure. Allowance may then be made for the heater bars to separate a certain amount from each other and allows bands to separate or pivot slightly when wrinkled portions of film laminae or other multiple thicknesses pass through the machine during sealing. One such system incorporating spring-loaded heat transfer elements which continuously bear inward against the bands with a pressure derived from springs is shown in U.S. Pat. No. 4,016,026 to John J. Grevich and Stanley D. Denker, a co-inventor in the present invention. That device confers an amount of self-adjustment to the system which, in turn, does show some improvement to its ability to deal with varying thicknesses of material traveling between the bands.

While a great deal of progress has been made in the direction of solving the problems with regard to improving the consistency of machines for heat sealing film material, particularly where there is a possibility of variances in the thickness of the film being sealed, even the previous so-called self-adjusting systems lack the desired flexibility as to what materials can be processed. They also lack sufficient sensitivity to thickness changes desireable for present day high speed operation. Thus, improved quality of seals produced together with freedom from jamming are still sought after goals with such machines.

SUMMARY OF THE INVENTION

The present invention goes a long way toward solving the problems associated with controlling and modulating the pressure between members of pairs of heating and/or cooling bars utilized in a heat sealing machine. By means of the present invention, closer, more sensitive control of the inter-bar gap and allowable sealing pressure is achieved by the provision of a fluid pressure adjustable, spring-biased system which can be used to control and modulate the maximum force applied to the band between the bars according to the type or configuration of material to be processed. Not only does this system improve the non-jamming characteristics of the sealing system, it also improves sealing quality and the versatility of the equipment with respect to what can be handled.

The preferred embodiment contemplates one or a series of pairs of opposed heat transfer bars which accomplish heating and cooling of the materials to be sealed as such are carried and moved through the system via opposed speed matched conveyors operated in coordination with opposed speed matched belts or bands traveling between the bars of each pair. Each such pair includes a stationary bar and a movable adjustable bar which cooperates with the stationary bar to apply the desired amount of pressure to the sealing process.

In the preferred embodiment, the adjustable bar is mounted using a dual horizontal pivotal system in which a yoke carrying the adjustable bar is mounted from a first stationary pivot fixed to the frame or undercarriage plate of the sealing system and the second pivot which carries the adjustable bar is located on or fixed to the yoke. A spring member operates to rotate the yoke member about the first pivot in a manner to move adjustable bar away from the stationary bar. A fluid operated cylinder means is provided and mounted from the undercarriage frame of the apparatus such that the push rod of the cylinder operates against the second pivot point to oppose the force created by the spring member. The pressure in the fluid cylinder can readily be modulated and precise cooperation between the fluid cylinder and the speed used to produce the desired net effect with respect to pressure exerted on the moving endless belts or sealing bands between the pair of bars involved.

The cylinder/spring arrangement of the present invention then allows a great range of control than that can be achieved by springs alone inasmuch as the pressure or force behind the push rod created by air or other fluid can be modulated at will. The use of the dual pivot also creates flexibility in controlling the system as it provides for angular displacement between the bar to accommodate greater variations in thicknesses of material if required without jamming. Selection of the proper spring/cylinder combination enables a given machine to acquire a degree of flexibility not heretofore available.

DETAILED DESCRIPTION OF THE INVENTION

Figure 1:
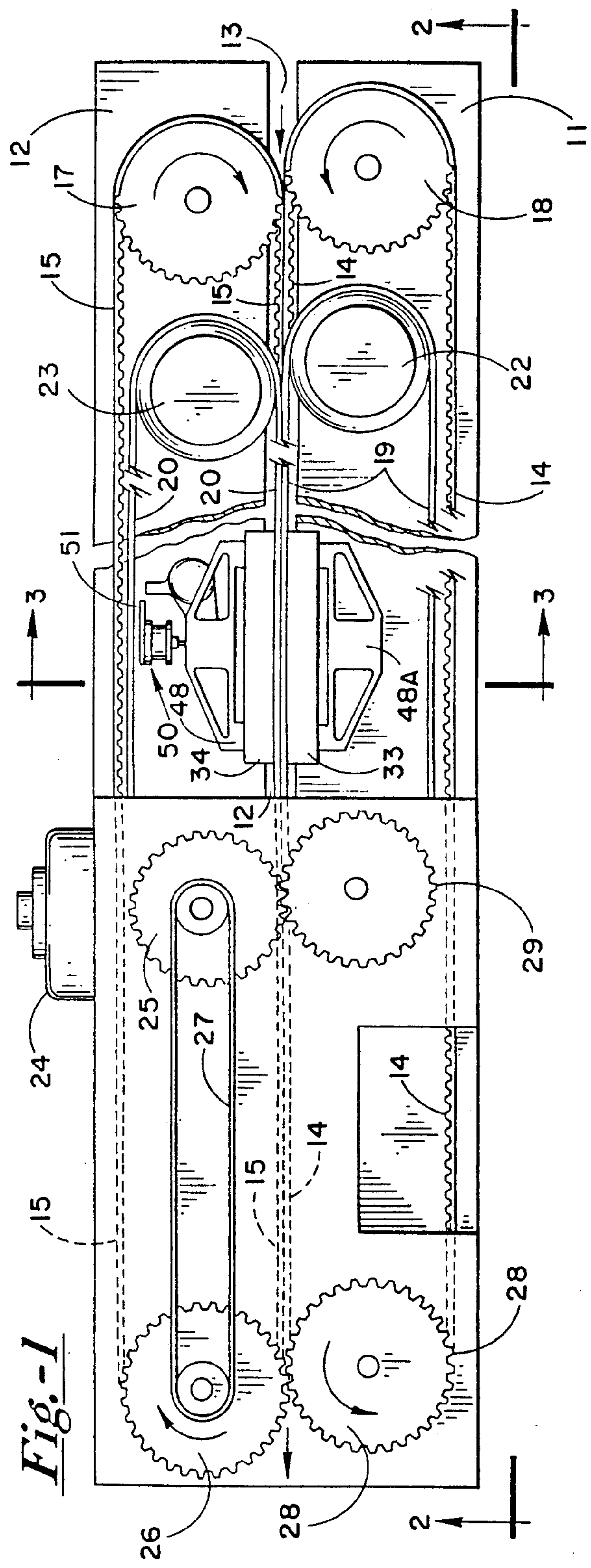
FIG. 1 depicts a partial top or plan view, with parts broken away for clarity of detail, showing a pair of heater bars mounted in a sealing machine in accordance with the invention.
Figure 2:
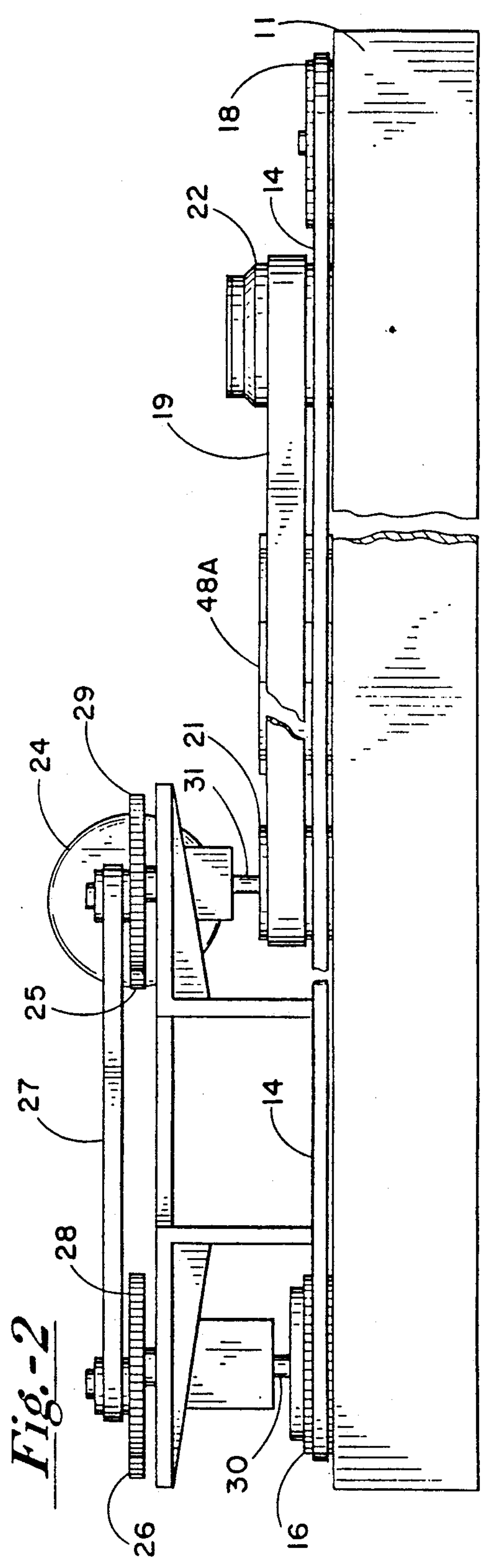
FIG. 2 is a side elevational view of the machines machine of FIG. 1.

A portion of a representative heat sealing machine in which the invention can be used is illustrated in FIGS. 1 and 2. Typically such a device is mounted on a conventional transportable floor stand (not shown) but can be mounted in any appropriate manner commensurate with the material to be sealed by the device and the requirements of the overall process. The sealing machine has undercarriage support or frame members 11 and 12 which define a slot 13 which extends throughout the entire length of the frame to permit the passage of film laminae including the tops of bags to be closed, or the like.

The bags to be sealed will travel through the machine in the direction that is indicated by arrows in FIG. 1. Opposed conveyor belts as at 14 and 15 carried on driven sprockets one of which is shown as 16 in FIG. 2 and idler sprockets 17 and 18. The belts are suited for gripping bags below the top edge thereof and support and carry the bags or film laminae through the machine in a well-known manner. As shown at 36 in FIG. 3, the upper edge portion of the bag or film laminae will pass between a pair of endless sealing heat transfer belts or bands 19 and 20 which may be formed of stainless steel, for example, with a heat resistant slippery plastic coating on the faces thereof to prevent sticking of the bands to the film laminae being sealed. Alternatively, the bands may be of fiberglass or other material which has the strength and temperature characteristics to serve the purpose. Thus, band 19 is mounted for travel around a pair of bandwheels including a drive bandwheel 21 and an idler bandwheel 22 and band 20 likewise is trained around idler wheel 23 and a drive wheel not shown.

The drive system includes a motor 24 connected in conventional fashion to drive a drive gear 25 (FIG. 1) which is connected to a drive gear 26 by drive belt 27. The gears 25 and 26, in turn, drive gears 28 and 29 at the same speed in the opposite direction. The top gears, of course, directly drive respective belt sprockets or bandwheels through common axles as at 30 and 31.

As may be further observed, the adjacent bandwheels 22 and 23 are not mounted directly opposite each other but instead are slightly offset and, similarly, the other bandwheels are not directly opposite each other but are also slightly offset. The offset relationship permits the peripheries of the wheels or sprockets to bring the bands into closely spaced and substantially parallel relation with respect to each other thereby allowing adequate spacing between the peripheries of the wheels as to permit several thicknesses of film laminae or films of varying thicknesses to be moved between the wheels.

Pairs of identical heater bars as at 33 and 34 are disposed at opposite sides of the bands 19 and 20 and confront the linear faces of the bands to effectively create a heating station. As better shown in FIG. 3, each of the bars 33 and 34 is provided with an elongated slot or opening which extends longitudinally throughout the length of the bar which receives a electric heating element as at 35 for controlling the temperature of the heater bar. The heat transfer members 33 and 34 are normally in the form of rectangular blocks and may of copper, brass, carbon or other low friction, heat conducting materials which maximize heat transfer and minimize wear as the bands 19 and 20 travel along the members continuously. Each of the heat elements 35 can move in relation to the corresponding heater bar 33 or 34.

Figure 3:
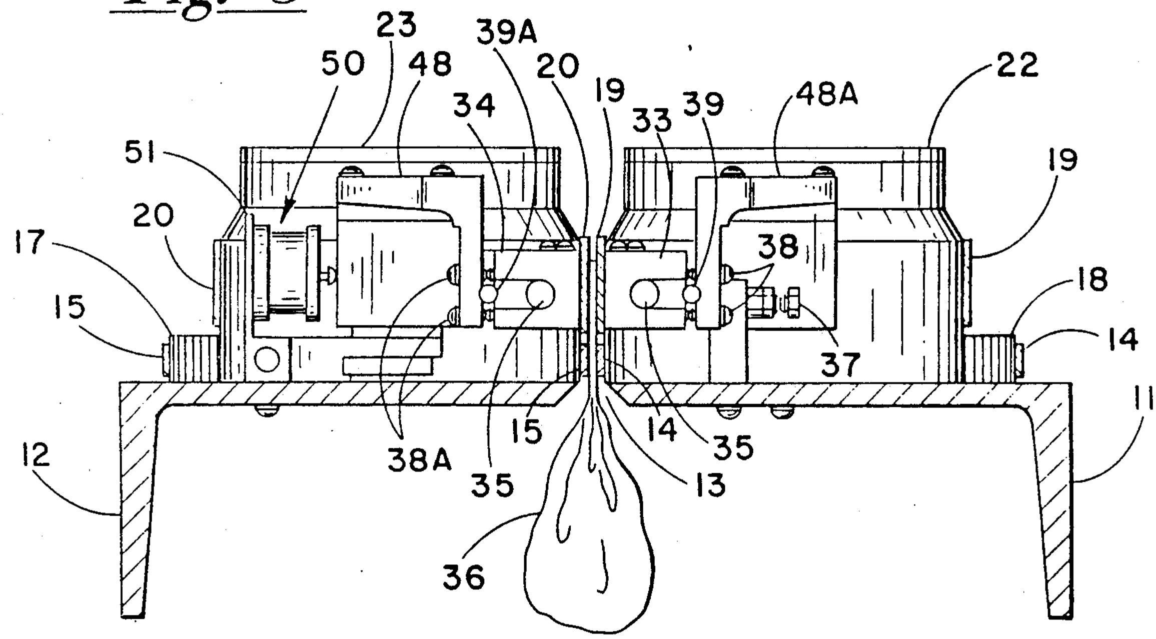
FIG. 3 is an enlarged detailed section view taken approximately at 3—3 in FIG. 1.
Figure 4:
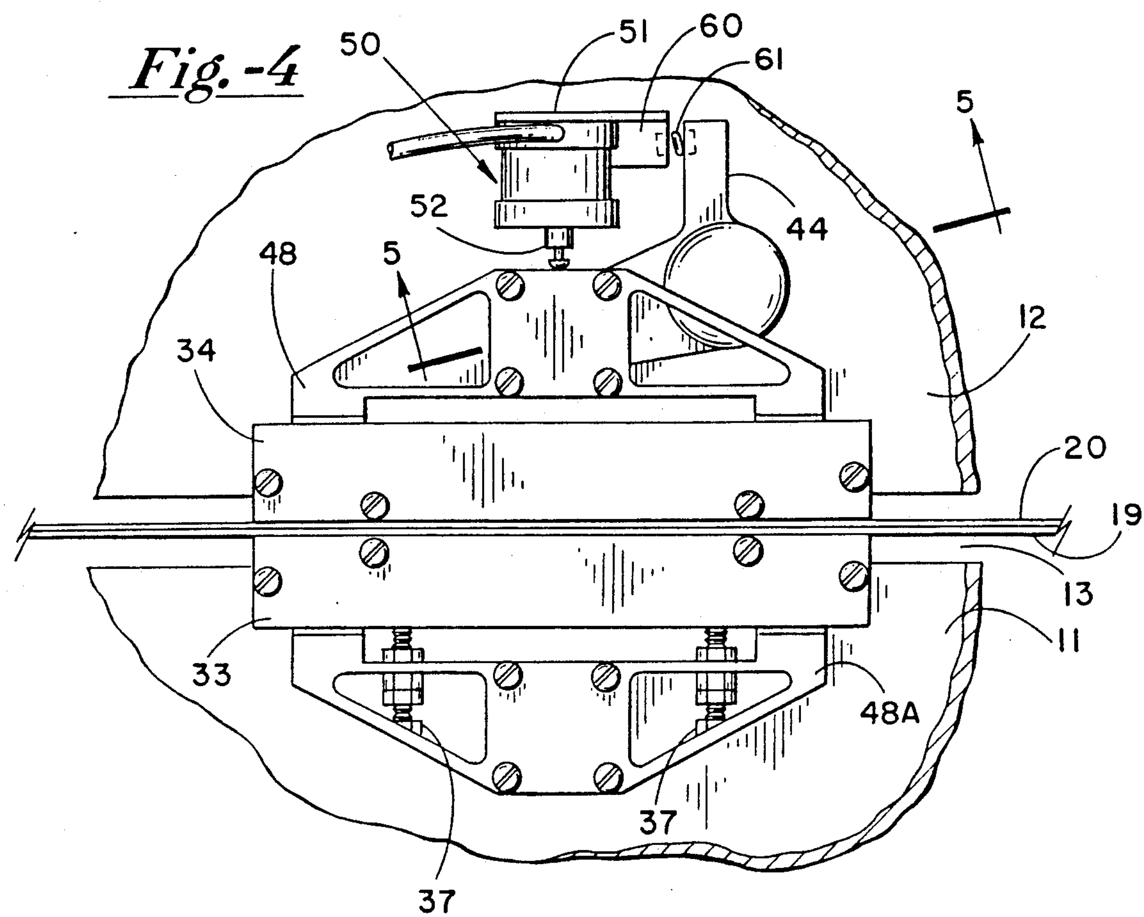
FIG. 4 is an enlarged detailed top plan view of the heater bar assembly of the invention.

The heater bar 33 carried by member 48A is fixed in relation to the path of travel of the belts 19 and 20 but ca be horizontally aligned as by spaced alignment screw members 37 shown in FIGS. 3 and 4 and aligned in the vertical plane as by alignment screws 38 in conjunction with pivot member 39 (FIG. 3). Once adjusted, the stationary bar member 33 acts as a positive stop with respect to the movable or pivoting bar member 34.

Figure 5:
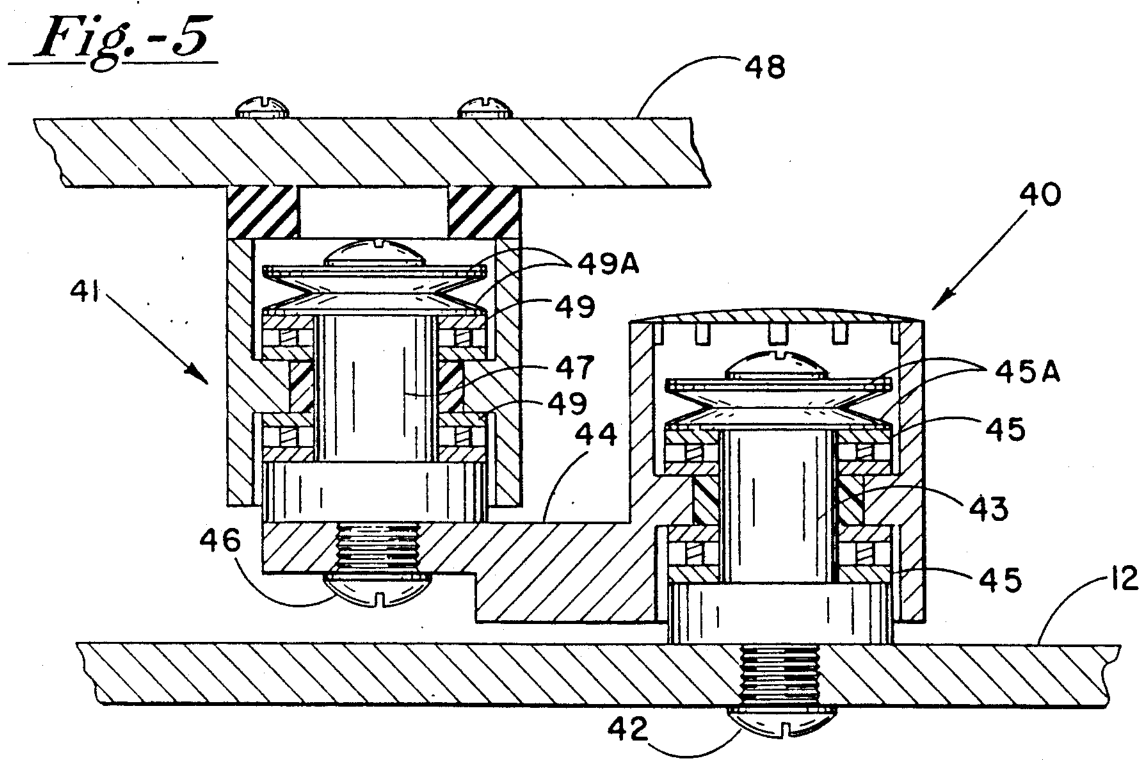
FIG. 5 is a detailed section view taken at approximately 5—5 in FIG. 4.

The dual pivot adjustable bar system of the present invention relates to the moveable heater bar 34 and the construction and operation of the system are best shown in FIGS. 3-5. The system is mounted and operates with respect to two distinctly spaced pivot assemblies 40 and 41. Pivot 40 is fixed to the undercarriage or frame member 12 as at 42 and contains pivot pin 43 which carries yoke member 44, as by a set of thrust needle bearings 45 retained by conical spring thrust washers 45A. Pivot assembly 41 is fixed to the yoke member 44 as at 46 and includes pivot pin member 47 which carries structural member 48 as by another set of thrust needle bearings 49 retained by conical spring washers 49A. As shown in FIG. 3, the heater bar 34 is mounted from the member 48 and therefore is free to pivot horizontally about the pivot pin 47. The yoke, in turn is free to pivot horizontally about the pivot pin 43. As was the case with the stationary bar 33, the adjustable bar 34 is provided with a means for alignment in the vertical plane as by adjustment screws 38A operating in conjunction with member 39A (FIG. 3).

As shown best in FIGS. 3 and 4, an air operated cylinder 50 is mounted in fixed relation to the undercarriage or frame member 12 as by a mounting bracket 51. The fluid cylinder has push rod 52 which operates against the structure of the movable pivot assembly 41. A spring member 61 is provided between an extension of the member 44 and a bracket member mounted from the frame member 11 at 60.

The compression spring 61 provides a force which tends to cause the yoke member 44 to rotate about pin 43 in a clockwise direction and this opposed by the force created by the operating rod 52 of the cylinder 50 which applies a force to the pin assembly 41 tending to cause rotating of the yoke member about pin 43 in a counter-clockwise direction. With respect to the adjustable heater bar 34, of course, the operation of the cylinder is such that it tends to cause the bar to close with and exert pressure on the stationary bar 33 and the spring member 61 opposes this force. It should be noted that the mounting of the bar 34 in further pivotal relation to the pin 47 allows an amount of pivotal motion of the heater bar with respect to the stationary bar to accommodate aberrations in thickness of the material traveling through the sealing system.

Selection of the tension produced by pressure spring 61 in conjunction with size and operating pressure of the cylinder 50 produces a very wide range of pressure values over which the force of the bar 34 can be carefully controlled with respect to the bar 33 and thus the operation of the sealing system. Also, because the cylinder will react to increased pressure in the system caused by thickness increases in the material going between the belts of the system, it does allow the sealing system to accommodate a range of thicknesses of material without further adjustment. The dual pivotal system in accordance with the invention provides a degree of flexibility for such sealing systems which was heretofore unavailable with respect to thickness changes and changes in the desired pressure to be applied.

Whereas other fluids can be used, the preferred type of cylinder 50 is a pneumatic or air operated cylinder to which the pressure can be varied or modulated over a wide range in a well-known manner. Also, while the system has been described with respect to a single pair of heating bars, a series of such pairs is also contemplated. In addition such pairs of bars can be used to apply pressure only or to apply cooling in the same mechanical mode as has been described for heat/pressure. The system in any event, has been shown to provide much improved control with respect to the versatility of the system and also it has made the system much more tolerant of aberrations in material thickness traveling through between the belts.

We claim:

1. A machine for heat sealing laminae of film of interest together in closing polyethylene bags or the like, comprising:

a pair of flexible, endless opposed sealing heat transfer bands fronting each other and traveling together to receive and transport the film laminae of interest therebetween for sealing;

at least one pair of elongate oppositely disposed heat transfer components disposed such that the members of each such pair face each other separated by confronting portions of the bands and co-extend therealong, each member of each pair having an elongate front face having a heat transfer surface positioned in a substantially vertical plane confronting a respective heat transfer band, wherein each such pair comprises a stationary heat transfer component and an adjustable heat transfer component and wherein the adjustable heat transfer component has the ability to move both laterally and pivotally in a substantially horizontal plane with respect to the corresponding stationary heat transfer component in response to forces therebetween while maintaining the angular disposition of the heat transfer surface to thereby control the pressure of sealing and thickness accommodation of laminae of interest;

means for applying a controllable force to urge each adjustable heat transfer component of a pair toward and in alignment with the matching stationary heat transfer component; and means for adjustably positively positioning each of the adjustable heat transfer components to position and align the corresponding matching heat transfer surface of each in the desired vertical disposition.

2. A machine for sealing laminae of film of interest as in closing bags or the like, comprising:

a pair of flexible, endless opposed sealing heat transfer bands fronting each other and traveling together to receive and transport the film laminae of interest therebetween for sealing;

a pair of elongate confronting heater bars aligned on opposite sides of and separated by portions of the bands and extending therealong, each of the bars having an elongate front face having a heat transfer surface positioned in a substantially vertical plane confronting a respective heat transfer band, wherein the paid comprises a stationary bar and an adjustable bar and wherein said adjustable bar has the ability to move both laterally and pivotally in a substantially horizontal plane with respect to the stationary bar in response to forces therebetween to thereby control with the bands the sealing pressure and thickness accommodation of the laminae of interest carried therebetween;

means for applying a controllable force to urge the adjustable bar toward said stationary bar;

means for adjustably positively positioning each of the heat transfer members to position and align the corresponding matching heat transfer surface of each in the desired vertical disposition; and means for modulating the force urging said adjustable bar toward said stationary bar.

3. A machine for sealing laminae of interest together as in closing a polyethylene bags or the like, comprising:

a support frame;

a pair of flexible, endless opposed sealing heat transfer bands fronting each other and traveling together to receive and transport the film laminae of interest therebetween for sealing;

at least one pair of elongate oppositely disposed heat transfer members flanking opposite sides of and separated by confronting portions of the bands and extending therealong, each member of each pair having an elongate front face having a heat transfer surface positioned in a substantially vertical plane confronting a respective heat transfer band, wherein each such pair further comprises a stationary heat transfer member and a movable heat transfer member and wherein the movable heat transfer member has the ability to move both laterally and pivotally with respect to the corresponding stationary heat transfer member in response to forces therebetween while maintaining the angular disposition of the heat transfer surface to thereby control the pressure of sealing and thickness accommodation of laminae of interest;

mounting means for carrying each movable heat transfer member comprising dual pivot system having a first stationary pivot member fixed in relation to the frame member and carrying a yoke member which is free to pivot about the first pivot member and second pivot member fixed to the yoke member and carrying the movable heat transfer member which is mounted so as to be free to pivot about the second pivot member;

means for applying a first modulating force to urge each yoke to pivot about each first pivot member in a direction to thereby urge each such movable heat transfer member toward each such stationary heat transfer member of a given pair; and means for applying a second force tending to oppose and modulate the first force.

4. The apparatus of claim 1 further comprising:

mounting means for carrying each adjustable heat transfer component comprising dual pivot system having a first stationary pivot member fixed in relation to the frame member and carrying a yoke member which is free to pivot about the first pivot member and second pivot member fixed to the yoke member and carrying the adjustable heat transfer component which is mounted so as to be free to pivot about the second pivot member;

wherein the means for applying a force to urge each adjustable heat transfer component toward the oppositely disposed stationary heat transfer component further comprises means for applying a first modulatable force to urge the yoke to pivot about each such first pivot member in a direction to thereby urge each such adjustable heat transfer component toward each such stationary heat transfer member of a given pair; and means for applying a second force tending to oppose the first force.

5. The apparatus of claim 2 further comprising:

mounting means for carrying each adjustable bar comprising dual pivot system having a first stationary pivot member fixed in relation to the frame member and carrying a yoke member which is free to pivot about the first pivot member and second pivot member fixed to the yoke member and carrying the adjustable bar which is mounted so as to be free to pivot about the second pivot member;

wherein the means for applying a force to urge each adjustable bar toward the oppositely disposed stationary bar further comprises means for applying a first modulatable force to urge the yoke to pivot about each such first pivot member in a direction to thereby urge each such adjustable heat transfer bar toward each such stationary heat transfer member of a given pair; and means for applying a second force tending to oppose the first force.

6. The apparatus of claim 3 further comprising means for adjustably positively positioning each of the adjustable heat transfer components to position and align the corresponding matching heat transfer surface of each in the desired vertical disposition.

7. The apparatus of claim 3 wherein the means for applying the first force is a fluid cylinder.

8. The apparatus of claim 4 wherein the means for applying the first force is a fluid cylinder.

9. The apparatus of claim 3 wherein the means for applying the first force is a fluid cylinder.

10. The apparatus of claim 7 wherein the means for applying the second force is a compression spring.

11. The apparatus of claim 8 wherein the means for applying the second force is a compression spring.

12. The apparatus of claim 9 wherein the means for applying the second force is a compression spring.

13. The apparatus of claim 7 wherein the cylinder is a pneumatic cylinder.

14. The apparatus of claim 8 wherein the cylinder is a pneumatic cylinder.

15. The apparatus of claim 9 wherein the cylinder is a pneumatic cylinder.

* * * * *

UNITED STATES PATENT AND TRADEMARK OFFICE

CERTIFICATE OF CORRECTION

PATENT NO. : 5 034 087

DATED : July 23, 1991

INVENTOR(S) : Stanley D. Denker, et al.

It is certified that error appears in the above-identified patent and that said Letters Patent is hereby corrected as shown below:

In column 5, line 67, delete "opposed".

In column 6, line 1, delete "transport" and insert -- carry -- .

In column 6, line 9, delete "paid" and insert -- pair -- .

In column 6, line 26, delete "a".

In column 8, line 3, delete "member" and insert -- bar -- .

In column 8, line 16, change the dependency from "3" to -- 5 -- .

Signed and Sealed this

Fifteenth Day of December, 1992

*Attest:*

DOUGLAS B. COMER

*Attesting Officer*

*Acting Commissioner of Patents and Trademarks*